(12) United States Patent
Matsushita et al.

(10) Patent No.: US 11,754,033 B2
(45) Date of Patent: Sep. 12, 2023

(54) IGNITION CONTROL DEVICE

(71) Applicant: Hitachi Astemo, Ltd., Hitachinaka (JP)

(72) Inventors: Takayasu Matsushita, Hitachinaka (JP); Osamu Mukaihara, Hitachinaka (JP); Kohei Suzuki, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/927,992

(22) PCT Filed: Feb. 12, 2021

(86) PCT No.: PCT/JP2021/005154
§ 371 (c)(1),
(2) Date: Nov. 28, 2022

(87) PCT Pub. No.: WO2022/004041
PCT Pub. Date: Jan. 6, 2022

(65) Prior Publication Data
US 2023/0213013 A1 Jul. 6, 2023

(30) Foreign Application Priority Data

Jun. 30, 2020 (JP) .................................. 2020-112710

(51) Int. Cl.
*F02P 5/15* (2006.01)
*F02P 5/153* (2006.01)
*F02P 3/04* (2006.01)

(52) U.S. Cl.
CPC ............. *F02P 5/1516* (2013.01); *F02P 5/153* (2013.01); *F02P 3/0407* (2013.01)

(58) Field of Classification Search
CPC ......... F02P 5/1516; F02P 5/153; F02P 3/0407
(Continued)

(56) References Cited

FOREIGN PATENT DOCUMENTS

| JP | 2001-193622 A | 7/2001 | |
| JP | 2004108298 | * 4/2004 | ............. F02P 17/12 |

(Continued)

OTHER PUBLICATIONS

International Search Report (PCT/ISA/210) issued in PCT Application No. PCT/JP2021/005154 dated May 25, 2021 with English translation (five (5) pages).

(Continued)

*Primary Examiner* — Hai H Huynh
(74) *Attorney, Agent, or Firm* — Crowell & Moring LLP

(57) ABSTRACT

Provided is an ignition control device capable of suppressing wear of an ignition plug due to occurrence of a re-strike without adding a component. An ECU 123 used as an ignition control device includes: an ignition signal calculation unit 203 that calculates a start timing and an end timing of re-energization with a primary current in one ignition process, compares the end timing of the re-energization with the timing at which the frequency of occurrence of a re-strike decreases, and determines whether to perform the re-energization; and an ignition signal generation unit 204 that generates an ignition signal for generating at least one or more spark discharges in the ignition process, outputs the ignition signal to the ignition coil, then generates the ignition signal when the ignition signal calculation unit determines to perform the re-energization, outputs the ignition signal to the ignition coil at the start timing of the re-energization, and does not generate the ignition signal when the ignition signal calculation unit determines not to perform the re-energization.

10 Claims, 14 Drawing Sheets

(58) Field of Classification Search
USPC .............. 123/620, 621, 623, 406.19, 406.23,
123/406.24, 406.26, 406.3, 406.35,
123/406.44, 406.45, 406.48, 406.55,
123/406.59
See application file for complete search history.

(56) References Cited

FOREIGN PATENT DOCUMENTS

| JP | 4521502 | * | 8/2010 | .............. F02P 17/12 |
| JP | 2015-132170 A | | 7/2015 | |

OTHER PUBLICATIONS

Japanese-language Written Opinion (PCT/ISA/237) issued in PCT Application No. PCT/JP2021/005154 dated May 25, 2021 (three (3) pages).

* cited by examiner

FIG. 14

| IGNITION TIMING ROTATION SPEED | BTDC 30deg | BTDC 10deg | ATDC10 deg |
|---|---|---|---|
| 1000rpm | 5.00ms | 1.67ms | −1.67ms |
| 2000rpm | 2.50ms | 0.83ms | −0.83ms |
| 4000rpm | 1.25ms | 0.41ms | −0.41ms |
| 6000rpm | 0.83ms | 0.28ms | −0.28ms |

IGNITION CONTROL DEVICE

TECHNICAL FIELD

The present invention relates to an ignition control device.

BACKGROUND ART

In recent years, in order to improve fuel consumption of a vehicle, a control device for an internal combustion engine has been developed that incorporates a technique of operating with an air-fuel mixture leaner than a theoretical air-fuel ratio (ultra-lean combustion), a technique of taking in a part of an exhaust gas after combustion and taking in the exhaust gas again (for example, exhaust gas recirculation (EGR)), and the like. In such a technique, it is necessary to sufficiently diffuse a lean air-fuel mixture in a cylinder to improve the ignitability by an ignition plug. As one of the techniques, there has been a technique for generating a turbulent flow (tumble) in air supplied into a cylinder.

In addition, there is known an ignition control device that generates a secondary current (a negative current in a direction opposite to a primary current) in a secondary coil by energizing a primary coil with the primary current or interrupting the flow of the primary current through the primary coil, and applies a secondary voltage induced in the secondary coil to an ignition plug to cause spark discharge. Regarding this ignition control device, for example, techniques such as a coil that applies high energy to electrodes of the ignition plug and a coil that superimposes energization of the primary coil have been proposed.

However, in the case of using such a coil as described above, in the latter half of the ignition process in which the ignition coil generates a spark discharge, an air-fuel mixture tends to cause a turbulent flow and the discharge energy of the ignition coil decreases. Due to this turbulent flow, a spark discharge generated between the electrodes of the ignition plug blows out, and a spark discharge is generated again, causing multiple discharge, which is not an original specification. A phenomenon in which the spark discharge is generated again by the discharge energy remaining in the ignition coil after the spark discharge blows out is referred to as "re-strike". When the re-strike occurs, capacitive (arc) discharge occurs between the electrodes of the ignition plug, and the electrodes of the ignition plug wear. When multiple discharge (multiple times of re-strike) occurs in one ignition process, the wear of the electrodes of the ignition plug is promoted. Therefore, as a technique for preventing the wear of electrodes of an ignition plug when multiple discharge occurs, a technique disclosed in the following PTL 1 has been known.

PTL 1 discloses that "In an ignition device for an internal combustion engine that forcibly cuts off spark discharge of an ignition plug, spark discharge cutoff control is operated when a secondary current generated in a secondary coil becomes a desired value or less.".

CITATION LIST

Patent Literature

PTL 1: JP 2015-132170 A

SUMMARY OF INVENTION

Technical Problem

In the technique disclosed in PTL 1, when a secondary current falls below a predetermined value during the generation of the spark discharge, a circuit configuration is switched so that a primary coil is energized in a direction opposite to the secondary current, whereby multiple discharge is interrupted. However, in order to use this technique, it is necessary to add a secondary current measurement device and a component for switching the circuit configuration according to the secondary current as compared with a conventional ignition circuit. For this reason, the number of components of the ignition circuit increases, and the product cost increases.

In addition, in a case where a behavior similar to that of the technology disclosed in PTL 1 is to be enabled without adding a component to the ignition circuit, it is assumed that the primary coil is energized again. However, if it is not determined whether the re-strike has occurred, the re-energization is performed even in a situation where the re-strike does not occur, and the ignition circuit may consume unnecessary energy.

The present invention has been made in view of such a situation, and it is an object of the present invention to suppress wear of an ignition plug due to occurrence of a re-strike.

Solution to Problem

The present invention is an ignition control device that controls ignition of an internal combustion engine in which energization of a primary coil with a primary current and interruption of the primary current flowing through the primary coil are controlled by an ignition signal input to an ignition coil including the primary coil disposed on a primary side and a secondary coil disposed on a secondary side, and an air-fuel mixture is ignited in a combustion chamber in a cylinder by spark discharge generated when a secondary voltage and a secondary current induced in the secondary coil by the interruption of the primary current are applied to an ignition plug connected to the secondary coil, the ignition control device including: an ignition signal calculation unit that calculates a start timing and an end timing of re-energization with the primary current within one ignition process, and compares the end timing of the re-energization with a timing at which a frequency of occurrence of a re-strike decreases to determine whether to perform the re-energization; and an ignition signal generation unit that generates an ignition signal for generating at least one or more spark discharges in the ignition process and outputs the ignition signal to the ignition coil, then generates an ignition signal when the ignition signal calculation unit determines to perform re-energization, outputs the ignition signal to the ignition coil at the start timing of the re-energization, and does not generate the ignition signal when the ignition signal calculation unit determines not to perform the re-energization.

Advantageous Effects of Invention

According to the present invention, since the occurrence of the re-strike is suppressed with the minimum energy consumption required even when a component for ignition control is not added to the ignition control device, wear of the ignition plug can be suppressed.

Problems, configurations, and effects other than those described above will be clarified from the following description of embodiments.

BRIEF DESCRIPTION OF DRAWINGS

FIG. 14 illustrates an example of a period of time from the ignition timing 1 to a top dead center timing at rotation speeds of 1000, 2000, 4000, and 6000 rpm in FIG. 13.

DESCRIPTION OF EMBODIMENTS

Figure 1:
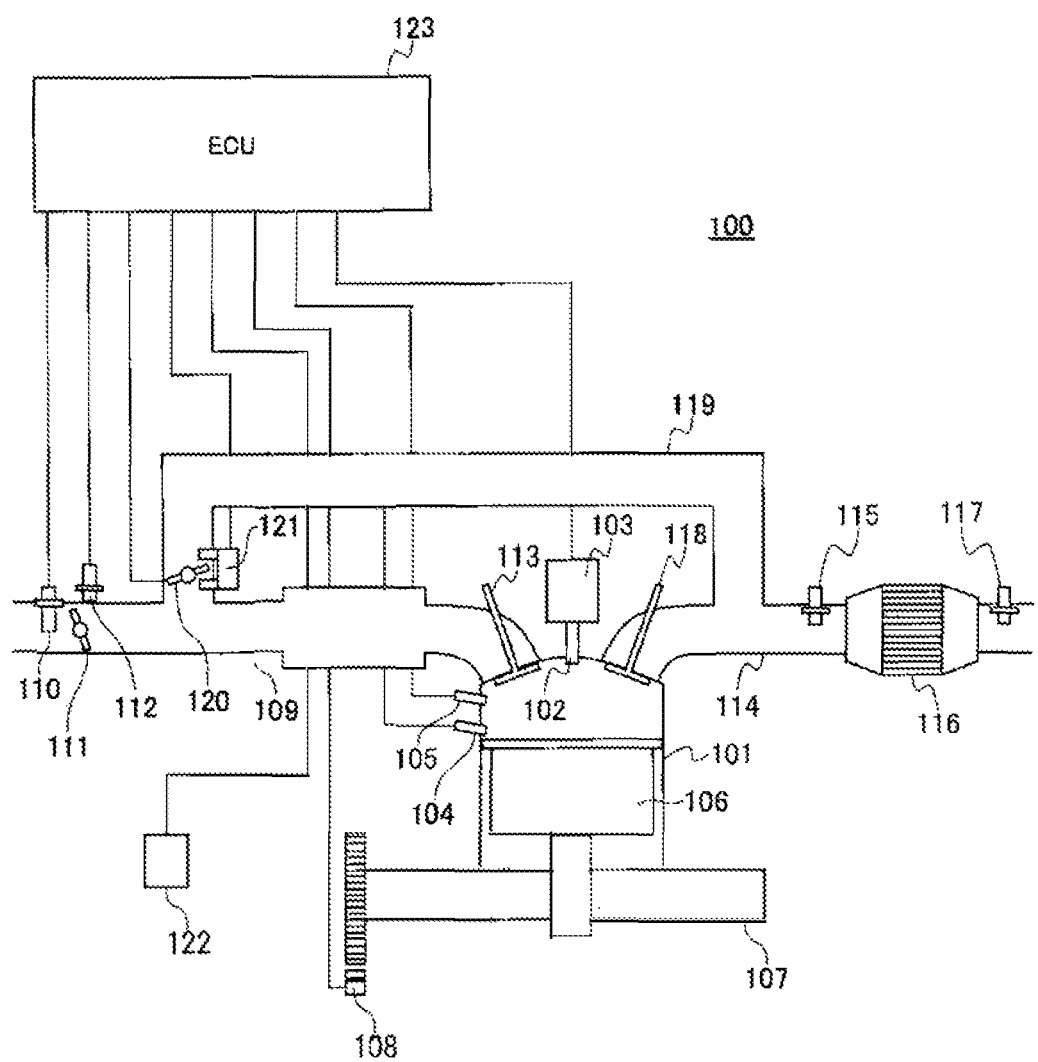
FIG. 1 is a diagram illustrating an overall configuration example of an internal combustion engine according to an embodiment of the present invention.

Hereinafter, embodiments of the present invention will be described in detail with reference to the drawings. In the present specification and the drawings, components having substantially the same functions or configurations are denoted by the same reference numerals, and redundant description is omitted.

Embodiment

First, an example of an internal combustion engine according to an embodiment of the present invention will be described.

FIG. 1 is a diagram illustrating an overall configuration example of an internal combustion engine 100. The internal combustion engine 100 is configured to adopt ultra-lean combustion that enables burning of an air-fuel mixture leaner than a theoretical air-fuel ratio, and EGR that burns an air-fuel mixture in which EGR gas is taken into intake air.

A combustion chamber is formed at a top portion of a cylinder 101 included in the internal combustion engine 100. In this combustion chamber, an ignition plug 102 to which an ignition voltage is applied, an ignition coil 103 that applies the ignition voltage to the ignition plug 102, and a fuel injection valve 104 are installed. In the cylinder 101, the pressure inside the cylinder 101 changes as a piston 106 moves up and down according to the rotation angle of a crankshaft 107. Therefore, an in-cylinder pressure sensor 105 measures the pressure (in-cylinder pressure) inside the cylinder 101 and outputs the in-cylinder pressure to an engine control unit (ECU) 123. A crank angle sensor 108 measures an angular rotation degree (crank angle) of the crankshaft 107 and outputs the crank angle to the ECU 123.

An air flow sensor 110, a throttle valve 111, a throttle position sensor 112, and the like are installed in an intake pipe 109 constituting an intake system.

The air flow sensor 110 measures the amount and temperature of air taken into the cylinder 101 from the intake pipe 109.

The throttle valve 111 adjusts the amount of air flowing into the intake pipe 109 and an intake pipe pressure in the intake pipe 109.

The throttle position sensor 112 detects the opening of the throttle valve 111.

Then, the air in the intake pipe 109 is taken into the combustion chamber by opening the intake valve 113.

A catalyst upstream air-fuel ratio sensor 115, an exhaust gas purification catalyst 116, a catalyst downstream air-fuel ratio sensor 117, and the like are installed in an exhaust pipe 114 constituting an exhaust system.

The catalyst upstream air-fuel ratio sensor 115 is an aspect of an air-fuel ratio detector, and detects the air-fuel ratio of an exhaust gas on the upstream side of the exhaust gas purification catalyst 116.

The exhaust gas purification catalyst 116 is a catalyst that purifies the exhaust gas.

The catalyst downstream air-fuel ratio sensor 117 is an aspect of an air-fuel ratio detector, and detects the air-fuel ratio of an exhaust gas on the downstream side of the exhaust gas purification catalyst 116.

The exhaust gas combusted in the combustion chamber is discharged from the combustion chamber to the exhaust pipe 114 by opening an exhaust valve 118, and post-treatment of the exhaust gas is performed.

An EGR pipe 119 is connected to the exhaust pipe 114 and the intake pipe 109. When an EGR valve 120 is opened, the exhaust gas in the EGR pipe 119 is recirculated to the intake pipe 109. An EGR flow rate sensor 121 measures a flow rate (EGR flow rate) of the exhaust gas to be recirculated to the intake pipe 109, and outputs the EGR flow rate to the ECU 123.

In addition, a water temperature sensor 122 is installed in the internal combustion engine 100. The water temperature sensor 122 measures the water temperature of cooling water for cooling the cylinder 101 and the like, and outputs the water temperature of the cooling water to the ECU 123.

These various sensors and actuators installed in the internal combustion engine 100 are connected to and controlled by the ECU 123. The ECU 123 manages operation states of the actuators based on values measured by the various sensors. Therefore, the ECU 123 is used as an example of an internal combustion engine control device that controls the operation of the internal combustion engine 100. However, in the present embodiment, attention is particularly focused on controlling the ignition timing of the ignition plug 102, and the ECU 123 is used as an example of an ignition control device.

In the above configuration, the fuel injection valve 104 may be installed in the intake pipe 109. Since the fuel injection valve 104 is installed in the intake pipe 109, the present invention can also be applied to a port injection type internal combustion engine.

<Configuration Example of ECU>

Figure 2:
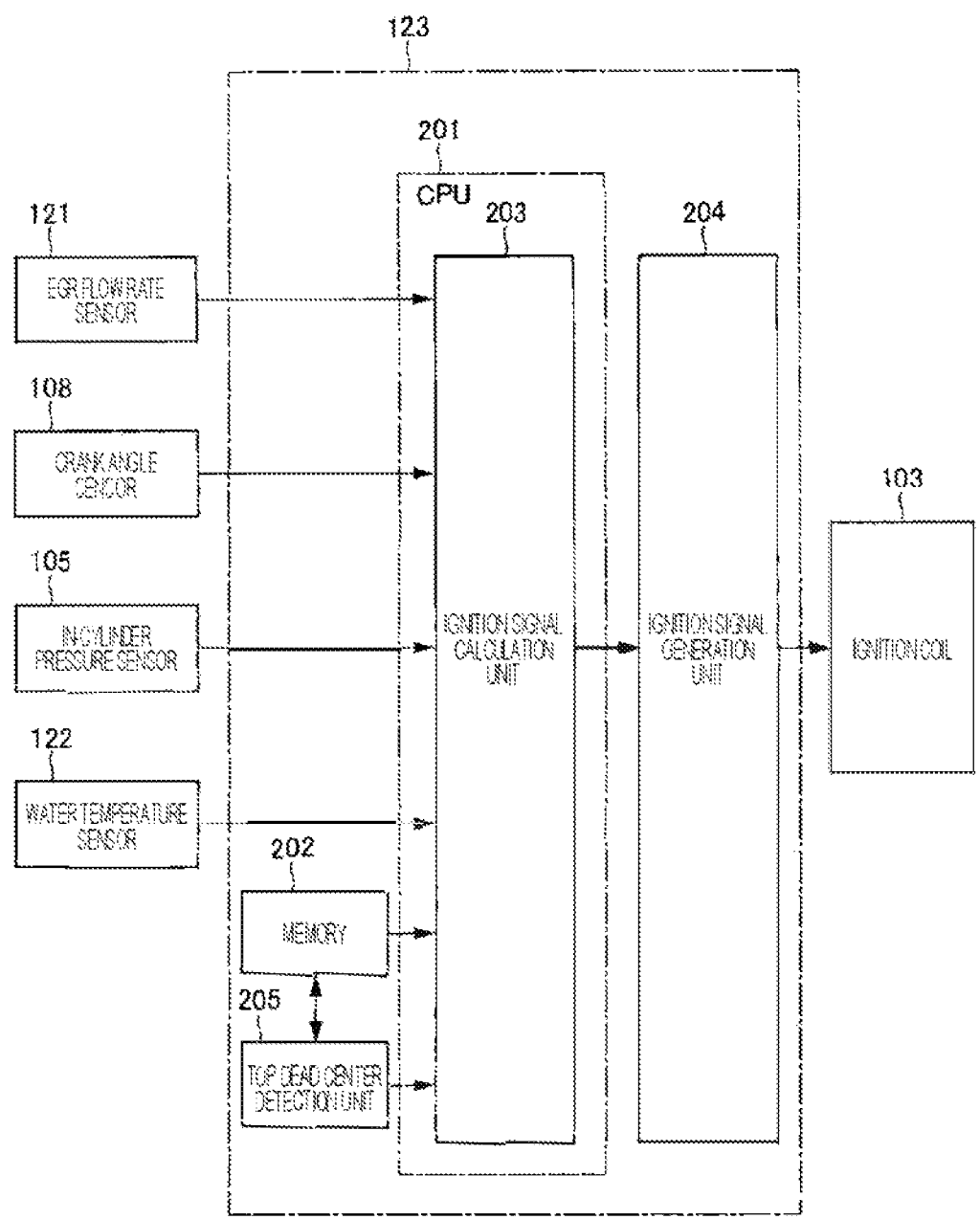
FIG. 2 is a block diagram illustrating a configuration example of an ECU according to the embodiment of the present invention.

FIG. 2 is a block diagram illustrating a configuration example of the ECU 123.

The ECU 123 includes a central processing unit (CPU) 201, a memory 202, an ignition signal generation unit 204, and a top dead center detection unit 205. The ECU 123 controls the ignition plug 102 by transmitting an ignition signal to the ignition coil 103.

The CPU 201 reads a program from the memory 202 and executes the program to control the operation of each unit in the ECU 123. The memory 202 includes a random access memory (RAM) that temporarily stores data necessary for executing the program, a read only memory (ROM) that stores the program, and the like.

The CPU 201 includes an ignition signal calculation unit 203. The EGR flow rate measured by the EGR flow rate sensor 121, the crank angle measured by the crank angle sensor 108, the in-cylinder pressure measured by the in-cylinder pressure sensor 105, and the water temperature measured by the water temperature sensor 122 are input to the ignition signal calculation unit 203.

Then, the ignition signal calculation unit 203 calculates the ignition signal on the basis of various types of information read from the memory 202 in addition to the EGR flow rate, the crank angle, the in-cylinder pressure, and the water temperature input from each sensor. A detailed internal configuration and processing of the ignition signal calculation unit 203 will be described with reference to FIG. 3 described later. The ignition signal calculation result calculated by the ignition signal calculation unit 203 is output to the ignition signal generation unit 204.

The ignition signal generation unit 204 generates the ignition signal on the basis of the ignition signal calculation result and transmits the ignition signal to the ignition coil 103.

Here, the ignition control device (ECU 123) includes: an ignition signal calculation unit (ignition signal calculation unit 203) that calculates a start timing and an end timing of re-energization with a primary current in one ignition process, compares the end timing of the re-energization with a timing at which the frequency of occurrence of the re-strike decreases, and determines whether to perform the re-energization; and an ignition signal generation unit (ignition signal generation unit 204) that generates an ignition signal for generating at least one or more spark discharges in the ignition process, outputs the ignition signal to the ignition coil 103, then generates an ignition signal when the ignition signal calculation unit 203 determines to perform the re-energization, outputs the ignition signal to the ignition coil 103 at the start timing of the re-energization, and does not generate the ignition signal when the ignition signal calculation unit 203 determines not to perform the re-energization. The ignition signal calculation unit 203 sets a timing at which the frequency of occurrence of the re-strike decreases to a timing at which the flow velocity of an air-fuel mixture between electrodes of the ignition plug 102 decreases and that is at and after the timing of the top dead center.

In addition, the ignition control device (ECU 123) includes a top dead center detection unit (top dead center detection unit 205) that detects a top dead center of the piston 106 that moves in the cylinder 101. The top dead center detection unit 205 includes the crank angle sensor 108 and information stored in the memory 202. When the crank angle sensor 108 detects the crank angle of the crankshaft 107, a value [deg] of the crank angle is time-sequentially written to the memory 202. The top dead center detection unit 205 can detect the top dead center of the piston 106 based on the crank angle read from the memory 202.

<Configuration Example of Ignition Signal Calculation Unit>

Figure 3:
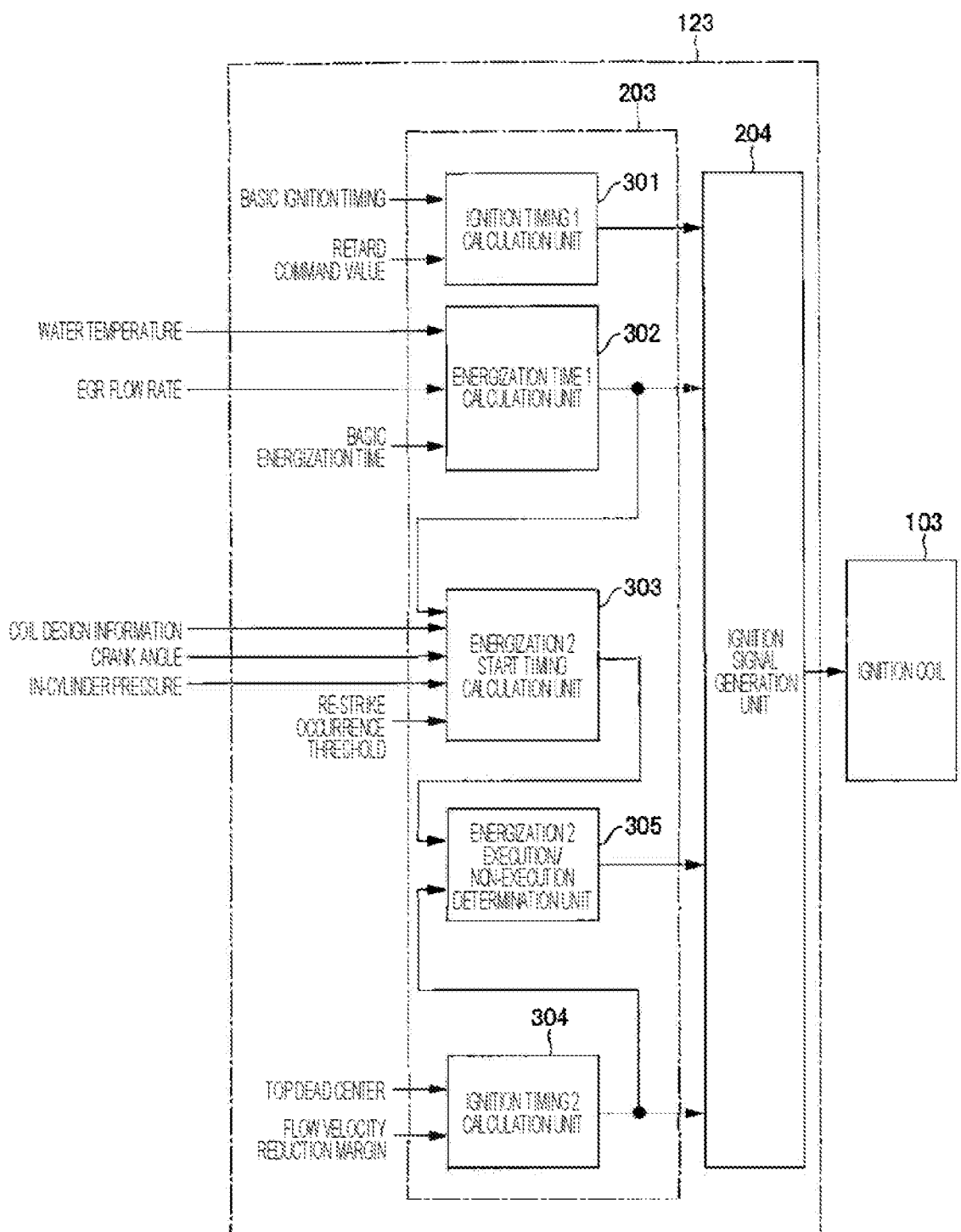
FIG. 3 is a block diagram illustrating a configuration example of an ignition signal calculation unit according to the embodiment of the present invention.

FIG. 3 is a block diagram illustrating a configuration example of the ignition signal calculation unit 203.

The ignition signal calculation unit 203 includes an ignition timing 1 calculation unit 301, an energization time 1 calculation unit 302, an energization 2 start timing calculation unit 303, an ignition timing 2 calculation unit 304, and an energization 2 execution/non-execution determination unit 305. The ignition signal calculation unit (ignition signal calculation unit 203) calculates the start timing of the re-energization, the end timing of the re-energization, and the timing of the top dead center based on the rotation angle of the piston 106.

The first ignition timing calculation unit (ignition timing 1 calculation unit 301) included in the ignition signal calculation unit (ignition signal calculation unit 203) calculates a first ignition timing (ignition timing 1) by subtracting a retard command value from a basic ignition timing. That is, the ignition timing 1 calculation unit 301 calculates the ignition timing 1 based on the basic ignition timing and the retard command value stored in the memory 202. The ignition timing 1 represents, for example, a timing at which the ignition signal turned on at the beginning (first time) of the combustion cycle is turned off. When the ignition signal is turned off, a spark discharge is generated between the electrodes of the ignition plug 102, and the air-fuel mixture is ignited. Note that the primary current with which the ignition coil 103 is energized from when the ignition signal is turned on to when the ignition signal is turned off at the beginning of the combustion cycle (first time) is referred to as "energization 1". The timing at which the energization 1 is started is referred to as a "start timing of the energization 1". The energization 1 represents the primary current with respect to re-energization to be determined for which it is determined whether to perform the re-energization to be described later, and is not limited to the beginning (first time) of the combustion cycle, and may be the second time or the third time.

The first energization time calculation unit (energization time 1 calculation unit 302) included in the ignition signal calculation unit (ignition signal calculation unit 203) calculates the first energization time (energization time 1) based on a basic energization time and the water temperature of the cooling water for cooling the internal combustion engine (internal combustion engine 100). The first energization time calculation unit (energization time 1 calculation unit 302) can calculate the first energization time (energization time 1) based on the basic energization time, the water temperature, and the flow rate of the EGR gas in the EGR pipe 119 connected such that a part of the exhaust gas after combustion recirculates from the exhaust pipe 114 to the intake pipe 109 as the EGR gas. That is, the energization time 1 calculation unit 302 calculates the energization time 1 from the water temperature, the EGR flow rate, and the basic energization time stored in the memory 202. The energization time 1 represents a time during which the ignition signal is turned on from the start timing of the energization 1 to the ignition timing 1.

The second energization start timing calculation unit (energization 2 start timing calculation unit 303) included in the ignition signal calculation unit (ignition signal calculation unit 203) includes the second energization start timing calculation unit (energization 2 start timing calculation unit 303) that calculates a second energization start timing (start timing of the energization 2), which is a start timing of re-energization, based on the rotation speed detected by the rotation speed detection unit (crank angle sensor 108) that detects the rotation speed of the internal combustion engine (internal combustion engine 100), the in-cylinder pressure detected by the in-cylinder pressure detection unit (in-cylinder pressure sensor 105) that detects the in-cylinder pressure in the combustion chamber, the cutoff timing of the primary current applied before re-energization for which it is determined whether to perform the re-energization, and a preset re-strike occurrence threshold. That is, the energization 2 start timing calculation unit 303 calculates the start timing of the energization 2 based on the energization time 1 calculated by the energization time 1 calculation unit 302, the crank angle, the in-cylinder pressure, coil design information stored in the memory 202, and the re-strike occurrence threshold. The coil design information is information that serves as a basis for calculating the re-strike occurrence threshold. The primary current with which the ignition coil 103 is re-energized in accordance with an ignition timing 2 is referred to as "energization 2". The timing at which the energization 2 is started is referred to as a "start timing of the energization 2".

In addition, the second ignition timing calculation unit (ignition timing 2 calculation unit 304) included in the ignition signal calculation unit (ignition signal calculation unit 203) calculates the second ignition timing (ignition timing 2) at which the air-fuel mixture is ignited by the spark discharge generated by interruption of the re-energization. That is, the ignition timing 2 calculation unit 304 calculates the ignition timing 2 based on the top dead center detected by the top dead center detection unit 205 and a flow velocity reduction margin read from the memory 202. The ignition timing 2 represents a timing at which the ignition signal turned on after the ignition timing 1 (second and subsequent times) is turned off. Since the ignition timing 2 is a value before being corrected by the energization 2 execution/non-execution determination unit 305, it is also referred to as "pre-correction ignition timing 2".

In addition, the re-energization execution determination unit (energization 2 execution/non-execution determination unit 305) included in the ignition signal calculation unit (ignition signal calculation unit 203) determines whether to perform the re-energization on the basis of the second energization start timing (start timing of the energization 2) and the second ignition timing (ignition timing 2) and outputs the ignition signal calculation result. That is, the energization 2 execution/non-execution determination unit 305 calculates an energization time 2 based on the start timing of the energization 2 calculated by the energization 2 start timing calculation unit 303 and the correction value of the pre-correction ignition timing 2 input from the ignition timing 2 calculation unit 304. The energization time 2 represents a time until the ignition signal turned on at the ignition timing 2 is turned off. Then, the energization 2 execution/non-execution determination unit 305 determines whether to perform the energization 2.

The ignition timing 1 calculated by the ignition timing 1 calculation unit 301, the energization time 1 calculated by the energization time 1 calculation unit 302, the ignition timing 2 calculated by the ignition timing 2 calculation unit 304, and the energization time 2 calculated by the energization 2 execution/non-execution determination unit 305 are input to the ignition signal generation unit 204 that generates an ignition signal as an ignition signal calculation result.

The ignition signal generation unit (ignition signal generation unit 204) outputs, to the ignition coil (ignition coil 103), an ignition signal generated on the basis of a first ignition timing (ignition timing 1) that is an ignition timing immediately before re-energization, a first energization time (energization time 1) when the primary current is applied immediately before re-energization, a second ignition timing (ignition timing 2), and the ignition signal calculation result.

<Configuration Example of Ignition Coil>

Figure 4:
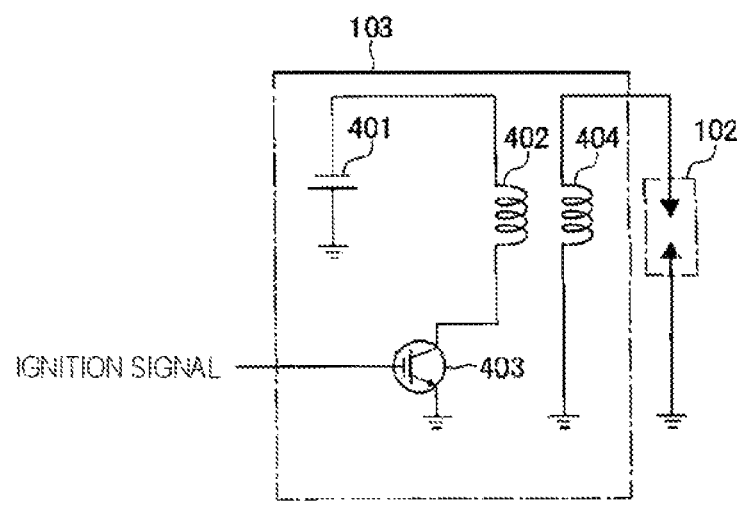
FIG. 4 is a diagram illustrating a configuration example of an ignition coil according to the embodiment of the present invention.

FIG. 4 is a diagram illustrating a configuration example of the ignition coil 103.

The ignition coil 103 includes a power supply 401, a primary coil 402, a switching device 403, and a secondary coil 404.

The power supply 401 supplies a primary current and a primary voltage to the primary coil 402.

The switching device 403 switches energization or de-energization of the primary coil 402 according to ON or OFF of an ignition signal transmitted from the ECU 123 (ignition signal generation unit 204).

The secondary coil 404 is installed in parallel with the primary coil 402. One end of the secondary coil 404 is grounded, and the other end is connected to an electrode of the ignition plug 102.

Mutual induction occurs between the primary coil 402 and the secondary coil 404 according to energization/de-energization of the primary coil 402, and a high voltage (secondary voltage) and a secondary current are generated in the secondary coil 404.

The secondary voltage and the secondary current are applied to the ignition plug 102, and a spark discharge occurs between the electrodes of the ignition plug 102.

The ignition coil 103 may be configured as an ignition control circuit provided with one or more primary coils 402 and one or more secondary coils 404. The present invention can also be applied to the ignition coil 103 having such a configuration.

As described above, the ignition control device (ECU 123) according to the present embodiment is configured such that the energization of the primary coil 402 with the primary current and interruption of the primary current flowing through the primary coil 402 are controlled by the ignition signal input to the ignition coil (ignition coil 103) including the primary coil (primary coil 402) disposed on the primary side and the secondary coil (secondary coil 404) disposed on the secondary side, and the ignition of the internal combustion engine 100 in which the air-fuel mixture is ignited in the combustion chamber in the cylinder is controlled by the spark discharge generated by applying the secondary voltage and the secondary current induced in the secondary coil 404 by the primary current being interrupted to the ignition plug 102 connected to the secondary coil 404.

As described above, the ECU 123 determines whether to perform the re-energization based on the relationship between the end timing of the re-energization and the timing (for example, at and after the top dead center) when the frequency of occurrence of the re-strike decreases. Therefore, it is possible to suppress an increase in product cost due to addition of a secondary current measurement device to the ECU 123 and addition of a component for switching the circuit configuration according to the secondary current. In addition, since the ignition signal generation unit 204 does not generate the ignition signal when the ignition signal calculation unit 203 determines not to perform the re-energization, unnecessary energy consumption associated with the re-energization is suppressed. Since the ignition signal generation unit 204 generates the ignition signal only when the ignition signal calculation unit 203 determines to perform the re-energization, it is possible to suppress the occurrence of the re-strike with the minimum energy consumption required, and it is possible to reduce the wear of the ignition plug 102.

<Example of Ignition Control Process>

Next, an example of an ignition control process performed by the ECU 123 will be described with reference to FIGS. 5 to 12.

Figure 5:
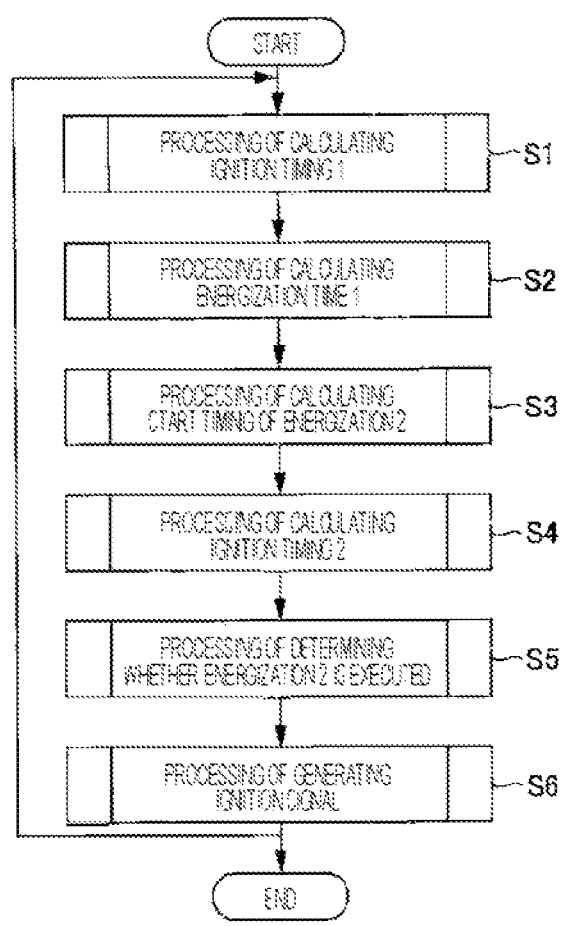
FIG. 5 is a flowchart illustrating an example of an ignition control process according to the embodiment of the present invention.

FIG. 5 is a flowchart illustrating an example of the ignition control process.

Figure 6:
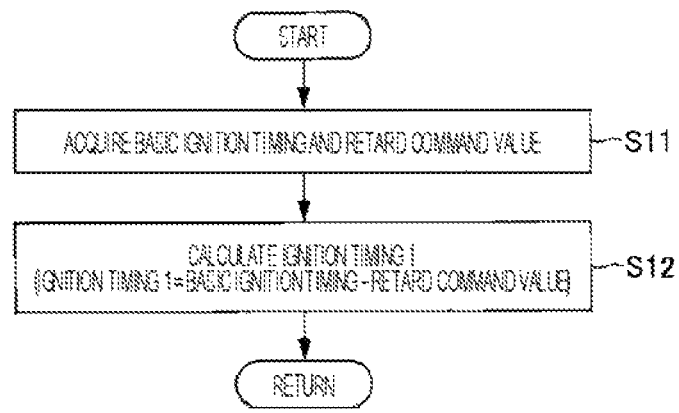
FIG. 6 is a flowchart illustrating an example of processing of calculating an ignition timing 1 in step S1 of FIG. 5.

First, the ignition timing 1 calculation unit 301 calculates the ignition timing 1 according to the control flow illustrated in FIG. 6 (S1).

Figure 7:
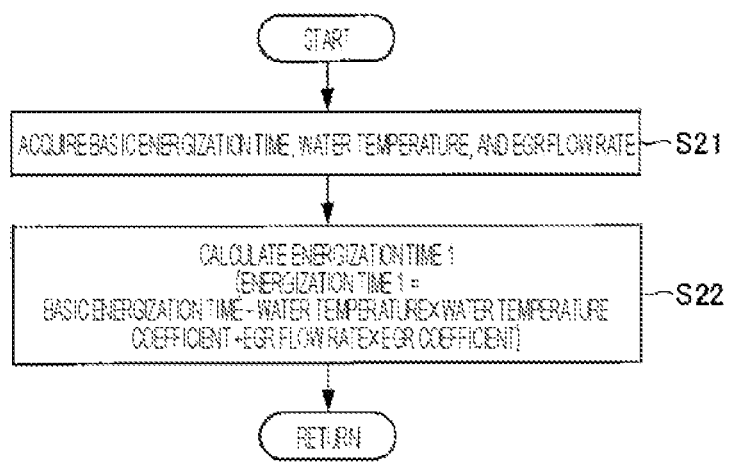
FIG. 7 is a flowchart illustrating an example of processing of calculating an energization time 1 in step S2 of FIG. 5.

Next, the energization time 1 calculation unit 302 calculates the energization time 1 according to the control flow illustrated in FIG. 7 (S2).

Figure 8:
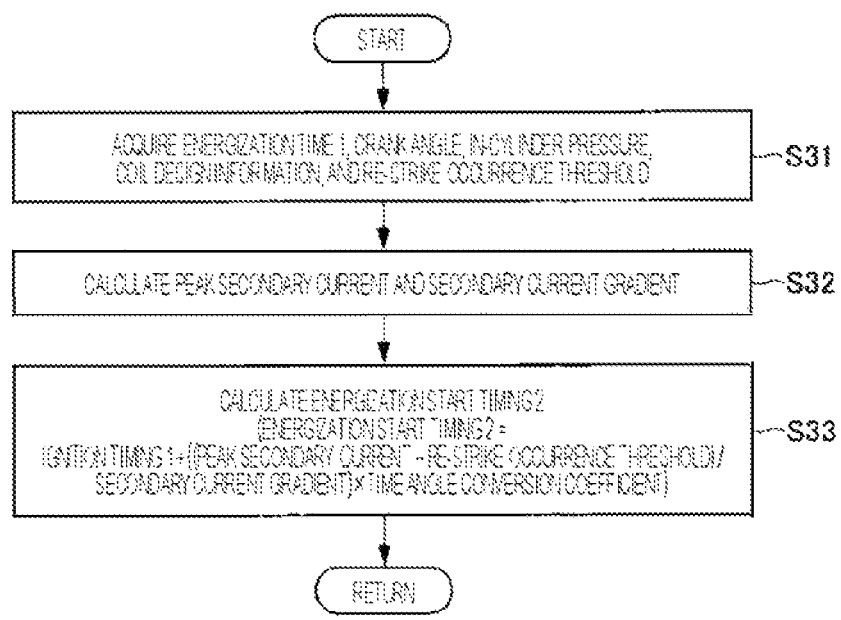
FIG. 8 is a flowchart illustrating an example of processing of calculating a start timing of energization 2 in step S3 of FIG. 5.

Next, the energization 2 start timing calculation unit 303 calculates the start timing of the energization 2 according to the control flow illustrated in FIG. 8 (S3).

Figure 10:
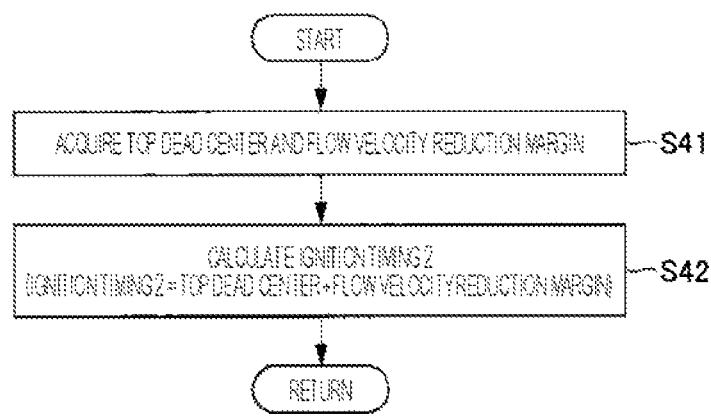
FIG. 10 is a flowchart illustrating an example of processing of calculating an ignition timing 2 in step S4 of FIG. 5.

Next, the ignition timing 2 calculation unit 304 calculates the pre-correction ignition timing 2 according to the control flow illustrated in FIG. 10 (S4).

Figure 11:
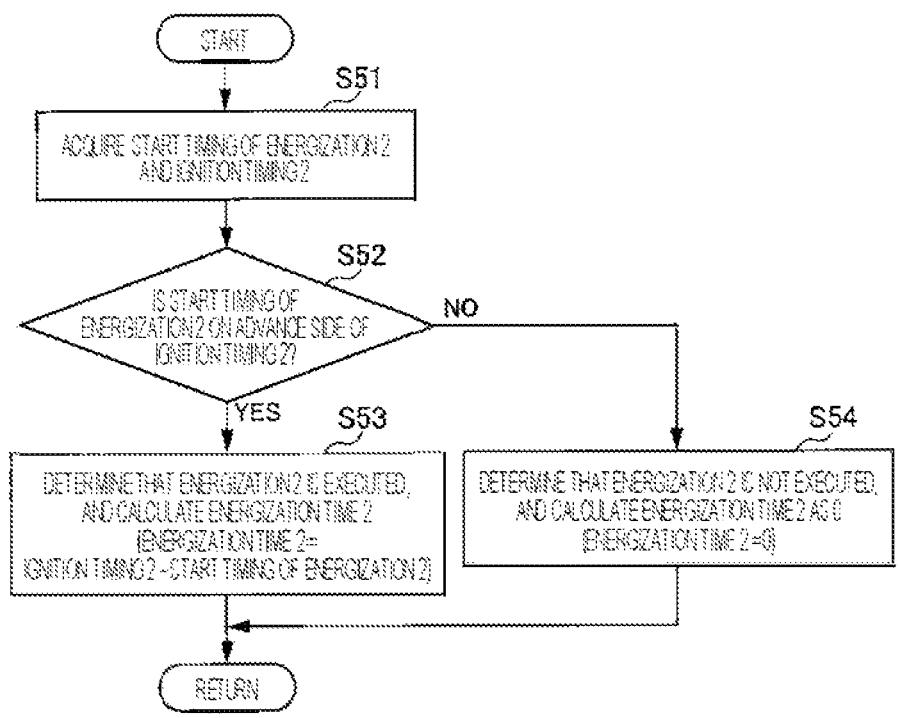
FIG. 11 is a flowchart illustrating an example of processing of determining whether to perform the energization 2 in step S5 of FIG. 5.

Next, the energization 2 execution/non-execution determination unit 305 determines whether to perform the energization 2 according to the control flow illustrated in FIG. 11 and calculates the energization time 2 (S5).

Figure 12:
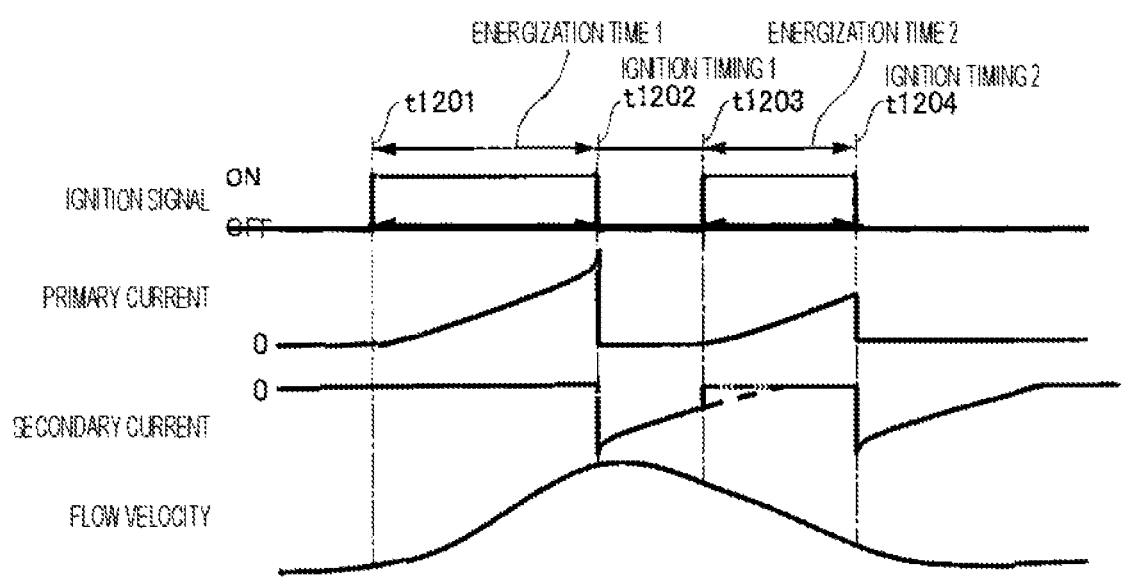
FIG. 12 is a timing chart illustrating an example of processing of generating an ignition signal in step S6 of FIG. 5.

Next, the ignition signal generation unit 204 generates an ignition signal according to the timing chart illustrated in FIG. 12 (S6).

FIG. 6 is a flowchart illustrating an example of processing of calculating the ignition timing 1 in step S1 of FIG. 5.

First, the ignition timing 1 calculation unit 301 acquires the basic ignition timing and the retard command value from the memory 202 (S11).

Next, the ignition timing 1 calculation unit 301 calculates the ignition timing 1 using an equation of "the ignition timing 1=the basic ignition timing+the retard command value" (S12), and returns the processing to FIG. 5. The ignition timing 1 calculation unit 301 uses a value set in advance for each specification of the internal combustion engine 100, and sets the basic ignition timing using, for example, an equation of "the basic ignition timing=the top dead center−a predetermined advance amount (10 deg or the like)". In addition, the ignition timing 1 calculation unit 301 sets a retard amount from the basic ignition timing as the retard command value according to the operating state of the internal combustion engine 100.

FIG. 7 is a flowchart illustrating an example of processing of calculating the energization time 1 in step S2 of FIG. 5.

First, the energization time 1 calculation unit 302 acquires the basic energization time, the water temperature, and the EGR flow rate (S21).

Next, the energization time 1 calculation unit 302 calculates the energization time 1 using an equation of "the energization time 1=the basic energization time−the water temperature×a water temperature coefficient+the EGR flow rate×an EGR coefficient" (S22), and returns the processing to FIG. 5. The energization time 1 calculation unit 302 uses a value set in advance for each specification of the internal combustion engine 100 and the ignition coil 103 as the basic energization time. In addition, since the spark discharge is less likely to occur as the water temperature decreases, the energization time 1 calculation unit 302 sets the water temperature coefficient so that the lower the water temperature, the longer the energization time. In addition, since the higher the EGR flow rate, the higher the energy is required to generate the spark discharge, the energization time 1 calculation unit 302 sets the EGR coefficient so that the higher the EGR flow rate, the longer the energization time.

FIG. 8 is a flowchart illustrating an example of processing of calculating the start timing of the energization 2 in step S3 of FIG. 5.

Figure 9A:
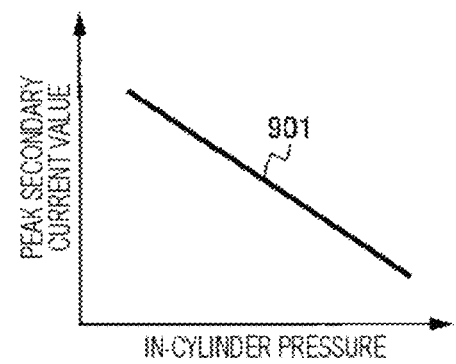
FIG. 9 is a diagram illustrating an example of characteristics of a peak secondary current and a secondary current gradient, the start timing of the energization 2, the peak secondary current, the secondary current gradient, and a re-strike occurrence threshold.
Figure 9B:
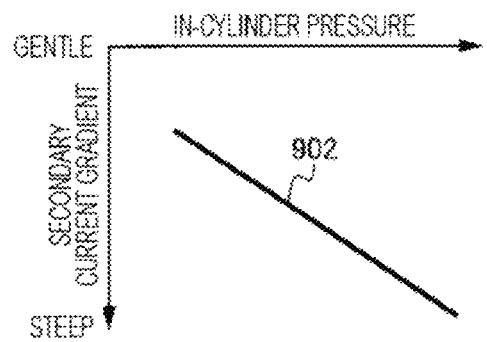
Figure 9C:
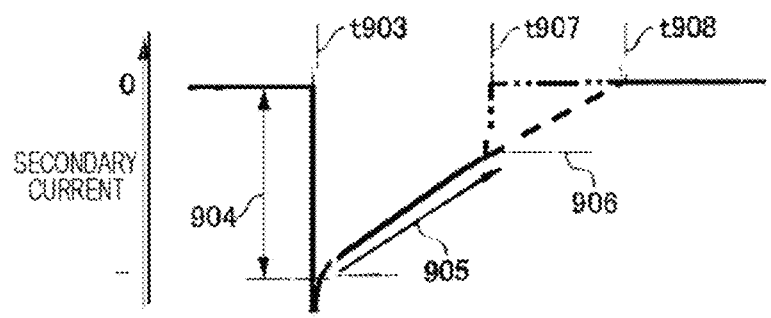

FIG. 9 is a diagram illustrating an example of characteristics of a peak secondary current and a secondary current gradient, the start timing of the energization 2, the peak secondary current, the secondary current gradient, and the re-strike occurrence threshold. FIG. 9(*a*) illustrates an example of a graph 901 in which the horizontal axis represents the in-cylinder pressure and the vertical axis represents the peak secondary current value. FIG. 9(*b*) illustrates an example of a graph 902 in which the horizontal axis represents the in-cylinder pressure and the vertical axis represents the secondary current gradient. FIG. 9(*c*) illustrates an example of an ignition timing 1 t903, a peak secondary current 904, a secondary current gradient 905, and a start timing t907 of the energization 2.

First, the energization 2 start timing calculation unit 303 acquires the energization time 1, the crank angle, the in-cylinder pressure, the coil design information, and the re-strike occurrence threshold (S31). The re-strike occurrence threshold is stored in the memory 202 in a state of being calculated in advance by the energization 2 start timing calculation unit 303, but may be calculated in accordance with the execution of step S31.

Next, the energization 2 start timing calculation unit 303 calculates the peak secondary current and the secondary current gradient (S32). The graph 901 of FIG. 9(*a*) illustrates a peak secondary current value characteristic in which the high peak secondary current value decreases as the in-cylinder pressure increases. Therefore, the energization 2 start timing calculation unit 303 measures the peak secondary current value corresponding to the in-cylinder pressure in advance and calculates the peak secondary current value.

In addition, the graph 902 of FIG. 9(*b*) illustrates a secondary current gradient characteristic in which the gentle secondary current gradient becomes steeper as the in-cylinder pressure increases. Therefore, the energization 2 start timing calculation unit 303 measures the secondary current gradient according to the in-cylinder pressure in advance and calculates the secondary current gradient.

Next, the energization 2 start timing calculation unit 303 calculates the start timing of the energization 2 according to the following Equation (1) (S33), and returns the processing to FIG. 5.

The start timing of the energization 2=the ignition timing 1 t903+{(the peak secondary current 904−the re-strike occurrence threshold 906)÷the secondary current gradient 905}×a time angle conversion coefficient (1)

The time angle conversion coefficient in Equation (1) is calculated by the following Equation (2), for example, when the internal combustion engine 100 has four cylinders 101 and each cylinder 101 repeats intake, compression, combustion, and exhaust cycles every 720 deg.

The time angle conversion coefficient=(the rotation speed [rpm]×720 [deg])÷2×60 [s] (2)

When the large peak secondary current 904 is applied to the secondary coil 404 at the ignition timing 1 t903 in FIG. 9(*c*), discharge occurs at electrodes of the ignition coil 103. Thereafter, the secondary current decreases at a constant decrease rate as indicated by the secondary current gradient 905. Here, when the secondary current is left until an ignition timing t908, the secondary current becomes 0. However, the re-strike is likely to occur.

Therefore, the ECU 123 measures the secondary current which is the current of the secondary coil 404 in advance, and sets a threshold for the secondary current at which the re-strike frequently occurs as the re-strike occurrence threshold 906. The ignition signal calculation unit (ignition signal calculation unit 203) sets a timing at which the secondary current exceeds the preset re-strike occurrence threshold as a strike occurrence timing, and matches the start timing of re-energization with the strike occurrence timing. Then, the ignition signal generation unit 204 of the ECU 123 generates an ignition signal so that the secondary current becomes 0 at the start timing t907 of the energization 2 at which the value of the secondary current becomes less than the re-strike occurrence threshold 906. Therefore, the occurrence of the re-strike is suppressed.

As described above, the second energization start timing calculation unit (energization 2 start timing calculation unit 303) calculates the peak value of the secondary current and the gradient of the secondary current that decreases from the peak value based on the first energization time (energization time 1), the rotation speed of the internal combustion engine (internal combustion engine 100), and the in-cylinder pressure, and calculates the second energization start timing (start timing of the energization 2) by adding the time calculated based on the peak value of the secondary current, the gradient of the secondary current, and the re-strike occurrence threshold to the first ignition timing (ignition timing 1). Then, the energization 2 start timing calculation unit 303 sets the start timing of the energization 2 so as to avoid the region where the re-strike frequently occurs, so that it is possible to suppress the occurrence of multiple discharge and reduce the wear of the ignition plug 102.

FIG. 10 is a flowchart illustrating an example of processing of calculating the ignition timing 2 in step S4 of FIG. 5.

First, the ignition timing 2 calculation unit 304 acquires the top dead center from the top dead center detection unit 205 and acquires the flow velocity reduction margin from the memory 202 or the like (S41). The top dead center is set in advance by the top dead center detection unit 205 based on the specifications of the internal combustion engine 100. In addition, it is desirable to set the flow velocity reduction margin to a value at which the flow velocity or the frequency of occurrence of the re-strike sufficiently decreases from the result of measuring the operating state of the internal combustion engine 100 and the flow velocity or the frequency of occurrence of the re-strike at or after the top dead center in advance.

Next, the ignition timing 2 calculation unit 304 sets the ignition timing 2 using an equation of "the ignition timing 2=the top dead center+the flow velocity reduction margin" (S42), and returns the processing to FIG. 5.

As described above, the ignition control device according to the present embodiment includes the top dead center detection unit 205 that detects the top dead center of the internal combustion engine 100. The ignition signal calculation unit 203 sets the ignition timing 2 to at least the top dead center or a timing after the top dead center, and the flow velocity between the electrodes of the ignition plug 102 is reduced at or after the top dead center, so that the re-strike frequency is reduced. Therefore, wear of the ignition plug 102 can be reduced.

FIG. 11 is a flowchart illustrating an example of processing of determining whether to perform the energization 2 in step S5 of FIG. 5.

First, the energization 2 execution/non-execution determination unit 305 acquires the start timing of the energization 2 from the energization 2 start timing calculation unit 303, and acquires the ignition timing 2 from the ignition timing 2 calculation unit 304 (S51).

Next, the energization 2 execution/non-execution determination unit 305 determines whether the start timing of the energization 2 is on the advanced side of the ignition timing 2 (S52).

When the energization 2 execution/non-execution determination unit 305 determines that the start timing of the energization 2 is on the advanced side of the ignition timing 2 (YES in S52), the energization 2 execution/non-execution determination unit 305 sets the energization time 2 using an equation of "the energization time 2=the ignition timing 2−the start timing of the energization 2" (S53), and returns the processing to FIG. 5.

On the other hand, when the energization 2 execution/non-execution determination unit 305 determines that the start timing of the energization 2 is not on the advanced side of the ignition timing 2 (NO in S52), the energization 2 execution/non-execution determination unit 305 sets the energization time 2 to 0 (S54), and returns the processing to FIG. 5. The energization 2 execution/non-execution determination unit 305 also causes the processing to proceed to step S54 and sets the energization time 2 to 0 when the start timing of the energization 2=the ignition timing 2.

As described above, the ignition signal calculation unit (ignition signal calculation unit 203) determines to perform the re-energization when the start timing of the re-energization is on the advanced side of the end timing of the re-energization, and determines not to perform the re-energization when the start timing of the re-energization is on the retarded side of the end timing of the re-energization. Since it is determined whether the re-energization is performed in this manner, the ignition signal is generated only when the ignition signal calculation unit 203 determines to perform the re-energization. Here, the energization 2 execution/non-execution determination unit 305 outputs the result of determining to perform the re-energization to the ignition signal generation unit 204 when the start timing of the energization 2 is on the advanced side of the ignition timing 2. Since the ignition signal generation unit 204 outputs the ignition signal generated on the basis of the determination result to the ignition coil 103, the ignition coil 103 can ignite the ignition plug 102. As described above, the ECU 123 can suppress the occurrence of the re-strike with the minimum energy consumption required, and can reduce the wear of the ignition plug 102.

In addition, the energization 2 execution/non-execution determination unit 305 outputs the result of determining not to perform the re-energization to the ignition signal generation unit 204 when the start timing of the energization 2 is on the retarded side of the ignition timing 2. Since the ignition signal generation unit 204 does not generate the ignition signal on the basis of the determination result, the ignition coil 103 does not ignite the ignition plug 102. Here, since the flow velocity between the electrodes of the ignition plug 102 is reduced at the start timing of the energization 2 set at or after the top dead center, so that the re-strike does not occur, the ignition signal generation unit 204 does not generate the ignition signal, and the ignition coil 103 does not perform the energization 2. Therefore, unnecessary energy consumption in the ignition coil 103 due to the energization 2 can be suppressed.

FIG. 12 is a timing chart illustrating an example of processing of generating the ignition signal in step S6 of FIG. 5. This timing chart shows the state of the ignition signal, the primary current, the secondary current, and the flow rate. The flow velocity represents the flow velocity of the air-fuel mixture between the electrodes of the ignition plug 102.

The ignition timing 1, the energization time 1, the ignition timing 2, and the energization time 2 generated in steps S1 to S5 of FIG. 5 are input to the ignition signal generation unit 204. The ignition signal generation unit 204 generates the ignition signal so that the ignition timing 1 is time t1202, the energization time 1 is time t1202–time t1201, the ignition timing 2 is time t1204, and the energization time 2 is time t1204–time t1203. Here, the time t1201 represents the start timing of the energization 1 of the ignition coil 103 with the primary current (energization 1) in accordance with the ignition timing 1. The time t1203 represents the start timing of the energization 2 of the primary current (energization 2).

Processing of generating the ignition signal by the ignition signal generation unit 204 will be described below.

When the ignition signal is switched from OFF to ON at the time t1201 (start timing of the energization 1), the energization of the primary coil 402 is started. As the energization of the primary coil 402 continues, the primary current flowing through the primary coil 402 increases, and the magnetic field formed between the primary coil 402 and the secondary coil 404 becomes stronger.

When the ignition signal changes from ON to OFF at the time t1202 (ignition timing 1), the primary current supplied to the primary coil 402 becomes 0. At the same time when the primary current becomes 0, the secondary current flowing through the secondary coil 404 rapidly increases with the mutual induction between the primary coil 402 and the secondary coil 404, and a spark discharge is generated from the ignition plug 102. The secondary current decreases with time after the time t1202.

In general, the time t1202 is set to a timing at which the flow velocity between the electrodes of the ignition plug 102 is large. Since the flow velocity between the electrodes is large, the spark discharge generated between the electrodes is extended, so that the combustion feasibility is enhanced. Therefore, around the time t1202, the flow velocity between the electrodes of the ignition plug 102 is the highest before the top dead center. Thereafter, tumble decay occurs in the combustion chamber, so that the flow velocity between the electrodes of the ignition plug 102 decreases with time.

At the time t1203 (start timing of the energization 2), the ignition signal is switched from OFF to ON again, and the current flows through the primary coil 402 in the direction opposite to the secondary current by energizing the primary coil 402, so that the secondary current becomes 0.

In the processing of calculating the start timing of the energization 2 in step S3, the energization 2 start timing calculation unit 303 matches the generation timing of the time t1203 with the time at which the secondary current equal to or less than the re-strike occurrence threshold exceeds the re-strike occurrence threshold. In this manner, the energization 2 start timing calculation unit 303 adjusts the generation timing of the time t1203, thereby preventing frequent re-strikes and suppressing wear of the ignition plug 102.

In addition, when the ignition signal is turned from ON to OFF again at the time t1204 (ignition timing 2), the primary current becomes 0, the secondary current rapidly increases, and a spark discharge is generated from the ignition plug 102. However, the time t1204 is at or after the top dead center by step S4, the tumble decay progresses, and the flow velocity between the electrodes of the ignition plug 102 decreases. Therefore, multiple discharge in which the spark discharge generated between the electrodes of the ignition plug 102 blows out and the spark discharge occurs again does not occur, and wear of the ignition plug 102 due to the multiple discharge does not occur.

Figure 13A:
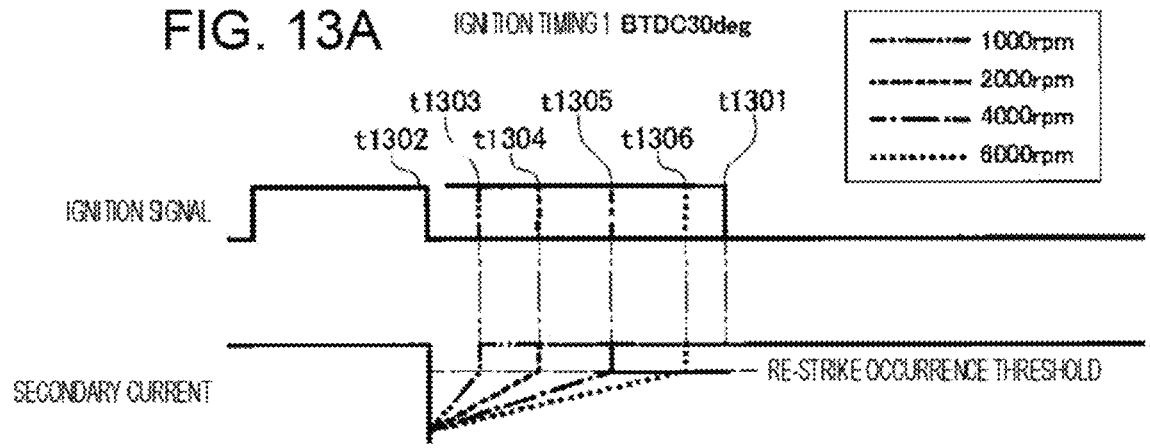
FIG. 13 is a timing chart illustrating an example of processing of determining whether to perform the energization 2 according to the embodiment of the present invention.
Figure 13B:
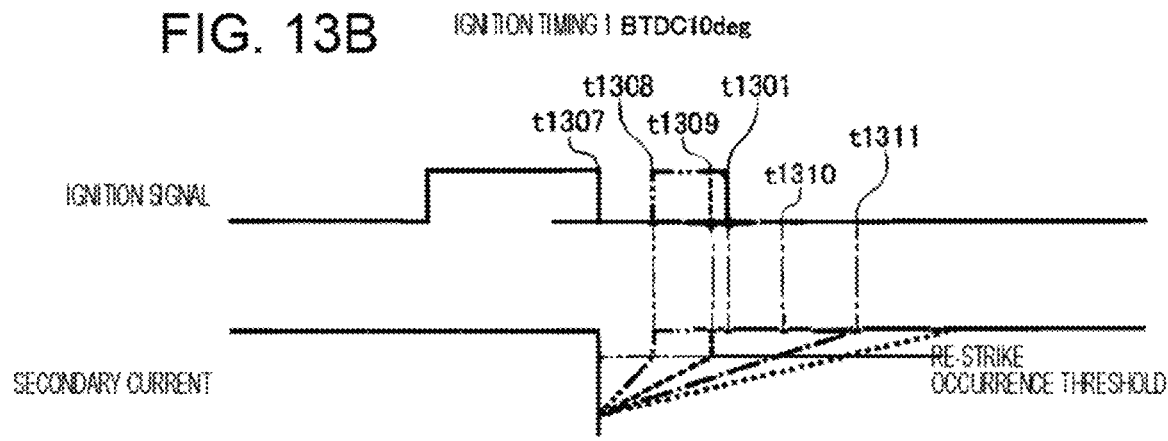

FIG. 13 is a timing chart illustrating an example of processing of determining whether to perform the energization 2 according to the present embodiment. A top dead center timing t1301 illustrated in FIG. 13 represents the timing of the top dead center. FIG. 13(a) illustrates a case where the ignition timing 1 is 30 deg BTDC, FIG. 13(b) illustrates a case where the ignition timing 1 is 10 deg BTDC, and FIG. 13 (c) illustrates a case where the ignition timing 1 is 10 deg after top dead center (ATDC).

Figure 13C:
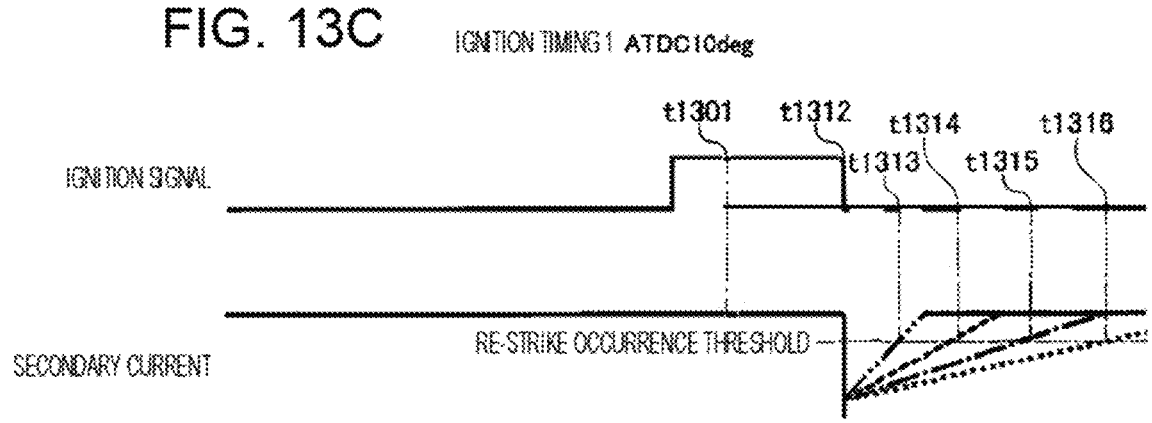

FIG. 14 illustrates an example of a period of time from the ignition timing 1 to a top dead center timing t1301 at rotation speeds of 1000, 2000, 4000, and 6000 rpm in FIG. 13. For example, FIG. 13(a) illustrates the period of time from the ignition timing 1 (t1302) to the top dead center timing t1301, and FIG. 13 (b) illustrates a period of time from the ignition timing 1 (t1307) to the top dead center timing t1301. In addition, FIG. 13(c) illustrates a period of time from the ignition timing 1 (t1312) to the top dead center timing t1301. When the rotation speed differs, the time between the ignition timing 1 (fixed angle) and the top dead center (fixed angle) changes. Therefore, FIG. 14 shows that the period of time from the ignition timing 1 to the top dead center timing t1301 is long when the rotation speed is low, and the period of time from the ignition timing 1 to the top dead center timing t1301 is short when the rotation speed is high.

FIGS. 13(a) to 13(c) are timing charts illustrating a result of the determination made by the energization 2 execution/non-execution determination unit 305 as to whether to perform the energization 2 in a case where the ignition timing 1 and the rotation speed differ. In FIGS. 13(a) to 13(c), the top dead center timing t1301 matches the ignition timing 2. In addition, in FIGS. 13(a) to 13(c), the timing charts are described assuming a case where a period of time from the ignition timing 1 until the secondary current falls below the re-strike occurrence threshold is 0.7 ms, and a period of time until the secondary current decreases to 0 is 1.0 ms.

The start timing of the energization 2 in a case where the ignition timing 1 t1302 illustrated in FIG. 13 (a) is 30 deg BTDC is represented by timing t1303 in a case of 1000 rpm, timing t1304 in a case of 2000 rpm, timing t1305 in a case of 4000 rpm, and timing t1306 in a case of 6000 rpm.

The period of time from the ignition timing 1 t1302 to the top dead center timing t1301 at each rotation speed at 30 deg BTDC in FIG. 14 is positive. In addition, as illustrated in FIG. 13(a), the time t1303 to the time t1306 are on the advanced side of the top dead center period t1301. Therefore, the energization 2 execution/non-execution determination unit 305 performs the energization 2 from each start timing of the energization 2 to the top dead center timing t1301.

The start timing of the energization 2 in a case where the ignition timing 1 t1307 illustrated in FIG. 13(b) is 10 deg BTDC is represented by timing t1308 in a case of 1000 rpm, timing t1309 in a case of 2000 rpm, timing t1310 in a case of 4000 rpm, and timing t1311 in a case of 6000 rpm.

The period of time from the ignition timing 1 t1307 to the top dead center timing t1301 at each rotation speed at 10 deg BTDC in FIG. 14 is positive. As illustrated in FIG. 13(b), the timings t1308 and t1309 are on the advanced side of the top dead center period t1301. Therefore, the energization 2 execution/non-execution determination unit 305 performs the energization 2 from each start timing of the energization 2 to the top dead center timing t1301 based on processing of determining whether to perform the energization 2 (YES in step S52) illustrated in FIG. 11. On the other hand, FIG. 13(b) shows that the timings t1310 and t1311 are on the retarded side of the top dead center timing t1301. Therefore, the energization 2 execution/non-execution determination unit 305 does not perform the energization 2 based on the processing of determining whether to perform the energization 2 (NO in step S52) illustrated in FIG. 11.

A case where the ignition timing 1 t1312 illustrated in FIG. 13(c) is 10 deg ATDC is illustrated. The start timing of the energization 2 is represented by timing t1313 in a case of 1000 rpm, timing t1314 in a case of 2000 rpm, timing t1315 in a case of 4000 rpm, and timing t1316 in a case of 6000 rpm.

The period of time from the ignition timing 1 t1312 to the top dead center timing t1301 at each rotation speed at 10 deg ATDC in FIG. 14 is negative. In addition, as illustrated in FIG. 13(c), it is indicated that the timing t1313 to the timing t1316 are on the retarded side of the top dead center timing t1301. Therefore, the energization 2 execution/non-execution determination unit 305 does not perform the energization 2 on the basis of the flowchart of FIG. 11.

Through the above processing, the energization 2 execution/non-execution determination unit 305 energizes the primary coil 402 from the timing t1303 to the timing t1306 illustrated in FIG. 13(a) and at the timing t1308 and the timing t1309 illustrated in FIG. 13(b), thereby suppressing the occurrence of multiple discharge and reducing the wear of the ignition plug 102.

In addition, the wear of the ignition plug 102 can be further suppressed by setting, as the start timing of the energization 2, the top dead center at which the frequency of re-strikes is reduced by reducing the flow velocity between the electrodes of the ignition plug 102. In addition, when the timing t1310 and the timing t1311 illustrated in FIG. 13(b) and the timing t1313 to the timing t1316 illustrated in FIG. 13(c) become the start timing of the energization 2, the top dead center timing t1301 has already passed, and the flow velocity between the electrodes of the ignition plug 102 is reduced, so that the frequency of re-strikes is reduced. Therefore, the energization 2 execution/non-execution determination unit 305 can suppress unnecessary energy consumption by not performing the energization 2.

The ECU 123 according to the embodiment described above determines whether to perform the re-energization based on the relationship between the end timing of the re-energization and the timing at which the frequency of occurrence of the re-strike decreases by the internal processing. Therefore, it is not necessary to add a circuit component for controlling the operation of the ignition coil 103 to increase the product cost. In addition, in a case where it is determined that the re-energization is to be performed, the ignition signal is generated, and in a case where it is determined that the re-energization is not to be performed, the ignition signal is not generated. Since the ignition signal is not always generated as described above, the occurrence of the re-strike can be suppressed with the minimum energy consumption required, and the wear of the ignition plug 102 can be reduced.

In addition, even in a case where the ultra-lean combustion or the EGR is performed, since the determination as to whether or not the re-energization is performed and the process of generating the ignition signal according to the present embodiment are performed, it is possible to suppress the occurrence of the re-strike and further suppress the wear of the ignition plug 102. Therefore, the technology according to the present embodiment contributes to prolonging the lifetime of the ignition plug 102.

Note that the internal combustion engine 100 may be configured not to perform EGR.

Note that the present invention is not limited to the embodiments described above, and it goes without saying that various other application examples and modifications can be taken without departing from the gist of the present invention described in the claims.

For example, the above-described embodiments describe the configurations of the internal combustion engine and the ignition control device in detail and specifically in order to describe the present invention in an easy-to-understand manner, and are not necessarily limited to those having all the described configurations. In addition, for a part of the configuration of each embodiment, it is possible to add, delete, and replace another configuration.

In addition, the control lines and the information lines indicate lines considered to be necessary for the description, and do not necessarily indicate all control lines and information lines on the product. In practice, it may be considered that almost all the configurations are connected to each other.

REFERENCE SIGNS LIST 100 internal combustion engine
102 ignition plug
103 ignition coil
106 piston
123 ECU
203 ignition signal calculation unit
204 ignition signal generation unit
205 top dead center detection unit
301 ignition timing 1 calculation unit
302 energization time 1 calculation unit
303 energization 2 start timing calculation unit
304 ignition timing 2 calculation unit
305 energization 2 execution/non-execution determination unit
402 primary coil
404 secondary coil

The invention claimed is:

1. An ignition control device that controls ignition of an internal combustion engine in which energization of a primary coil with a primary current and interruption of the primary current flowing through the primary coil are controlled by an ignition signal input to an ignition coil including the primary coil disposed on a primary side and a secondary coil disposed on a secondary side, and an air-fuel mixture is ignited in a combustion chamber in a cylinder by spark discharge generated when a secondary voltage and a secondary current induced in the secondary coil by the interruption of the primary current are applied to an ignition plug connected to the secondary coil, the ignition control device comprising:

an ignition signal calculation unit that calculates a start timing and an end timing of re-energization with the primary current within one ignition process, and compares the end timing of the re-energization with a timing at which a frequency of occurrence of a re-strike decreases to determine whether to perform the re-energization; and an ignition signal generation unit that generates an ignition signal for generating at least one or more spark discharges in the ignition process and outputs the ignition signal to the ignition coil, then generates an ignition signal when the ignition signal calculation unit determines to perform re-energization, outputs the ignition signal to the ignition coil at the start timing of the re-energization, and does not generate the ignition signal when the ignition signal calculation unit determines not to perform the re-energization.

2. The ignition control device according to claim 1, further comprising a top dead center detection unit that detects a top dead center of a piston moving in the cylinder, wherein the ignition signal calculation unit sets the timing at which the frequency of occurrence of the re-strike decreases to a timing at which a flow velocity of the air-fuel mixture between electrodes of the ignition plug decreases and that is at and after a timing of the top dead center.

3. The ignition control device according to claim 2, wherein the ignition signal calculation unit calculates the start timing of the re-energization, the end timing of the re-energization, and the timing of the top dead center based on a rotation angle of the piston, determines to perform the re-energization when the start timing of the re-energization is on an advanced side of the end timing of the re-energization, and determines not to perform the re-energization when the start timing of the re-energization is on a retarded side of the end timing of the re-energization.

4. The ignition control device according to claim 3, wherein the ignition signal calculation unit sets a timing at which the secondary current exceeds a preset re-strike occurrence threshold as a strike occurrence timing, and adjusts the start timing of the re-energization to the strike occurrence timing.

5. The ignition control device according to claim 4, wherein the ignition signal calculation unit includes a second energization start timing calculation unit that calculates a second energization start timing that is a start timing of the re-energization, based on a rotation speed detected by a rotation speed detection unit that detects the rotation speed of the internal combustion engine, in-cylinder pressure detected by an in-cylinder pressure detection unit that detects the in-cylinder pressure in the combustion chamber, a cutoff timing of the primary current applied before the re-energization for which it is determined whether to perform the re-energization, and the preset re-strike occurrence threshold.

6. The ignition control device according to claim 5, wherein
the ignition signal calculation unit includes
a second ignition timing calculation unit that calculates a second ignition timing at which the air-fuel mixture is ignited by the spark discharge generated by the interruption of the re-energization, and
a re-energization execution determination unit that determines whether to perform the re-energization based on the start timing of the second energization and the second ignition timing and outputs an ignition signal calculation result, and
the ignition signal generation unit outputs, to the ignition coil, the ignition signal generated based on a first ignition timing that is an ignition timing immediately before the re-energization, a first energization time when the primary current is applied immediately before the re-energization, the second ignition timing, and the ignition signal calculation result.

7. The ignition control device according to claim 6, wherein the second energization start timing calculation unit calculates a peak value of the secondary current and a gradient of the secondary current that decreases from the peak value, based on the first energization time, the rotation speed of the internal combustion engine, and the in-cylinder pressure, and calculates the second energization start timing by adding a time calculated based on the peak value of the secondary current, the gradient of the secondary current, and the re-strike occurrence threshold to the first ignition timing.

8. The ignition control device according to claim 7, wherein the ignition signal calculation unit includes
a first ignition timing calculation unit that calculates the first ignition timing by subtracting a retard command value from a basic ignition timing, and
a first energization time calculation unit that calculates the first energization time based on a basic energization time and a water temperature of cooling water for cooling the internal combustion engine.

9. The ignition control device according to claim 8, wherein the first energization time calculation unit calculates the first energization time based on the basic energization time, the water temperature, and a flow rate of EGR gas in an EGR pipe connected such that a part of an exhaust gas after combustion recirculates from an exhaust pipe to an intake pipe as the EGR gas.

10. The ignition control device according to claim 9, wherein an air-fuel mixture leaner than a theoretical air-fuel ratio is combusted in an ultra-lean manner in the internal combustion engine.

* * * * *